United States Patent [19]

Rengger et al.

[11] Patent Number: 4,461,024
[45] Date of Patent: Jul. 17, 1984

[54] INPUT DEVICE FOR COMPUTER SPEECH RECOGNITION SYSTEM

[75] Inventors: Ralph E. Rengger, Staines; David R. Manning, Morden, both of England

[73] Assignee: The Secretary of State for Industry in Her Britannic Majesty's Government of the United Kingdom of Great Britain and Northern Ireland, London, England

[21] Appl. No.: 326,444

[22] Filed: Dec. 1, 1981

[30] Foreign Application Priority Data

Dec. 9, 1980 [GB] United Kingdom ................. 8039425

[51] Int. Cl.³ .............................................. G10L 1/00
[52] U.S. Cl. ..................................................... 381/46
[58] Field of Search .................................. 381/36–50; 364/513.5

[56] References Cited

U.S. PATENT DOCUMENTS

3,803,357  4/1974  Sacks ..................................... 381/94
4,025,721  5/1977  Graupe et al. ........................ 381/94
4,230,906 10/1980  Davis ..................................... 381/49
4,239,936 12/1980  Sakoe .................................... 381/43

Primary Examiner—E. S. Matt Kemeny
Attorney, Agent, or Firm—Pollock, Vande Sande & Priddy

[57] ABSTRACT

Systems for the recognition of speech by computer have usually required that the speech be of a strictly standarized nature, free of such features as regional accent, and unaccompanied by background noise. The problem has been to produce a system providing information which will allow accurate recognition in the presence of noise, and with non-standard speech sounds. The invention provides to a computer in a speech recognition system information in parallel streams on a number of factors, viz, the existence, in any signal which may contain speech sounds, of a fundamental repetitive structure and its periodicity; the existence of a high frequency component having a wide frequency band; the existence of a component having energy relatively stable with respect to time and characteristic of background noise; the peak frequency, peak amplitude and band width of sounds lacking a low frequency component; and the frequency of resonant content of any component having a fundamental repetitive structure and the level of correlation.

10 Claims, 15 Drawing Figures

BLOCK DIAGRAM OF NPL SID3

Fig. 1.

BLOCK DIAGRAM OF NPL SID3

Fig. 2.

Fig.3.
- A INPUT SPEECH SIGNAL
- B VOICED OUTPUT BIT
- C PITCH FREQUENCY

Fig. 6A. VOICED SOUND "EE"

Fig. 6B. CLIPPED "EE"

Fig. 6C. UNVOICED SOUND "F"

Fig. 6D. CLIPPED "F"

INPUT DEVICE FOR COMPUTER SPEECH RECOGNITION SYSTEM

This invention relates to a speech input device for a system of computer recognition of speech.

Systems for the computer recognition of speech normally comprise an input device which receives speech sounds and converts them into electrical signals which when fed to a computer, suitably programmed, can be matched to a dictionary of signals stored in a computer memory. A match with a stored item of the memory indicates a word or phrase of the language in which the speech is produced, and the word or phrase can be stored in another computer memory, or be transmitted to an output device of the computer, such as an automatic typewriter, where the speech appears, converted to printed symbols.

Existing systems for computer recognition of speech have usually required speech of a specified undistorted quality received at a high signal to noise ratio. Such conditions can be obtained readily in the laboratory, but can seldom be obtained in practical situations, in which marked variations in speech quality and high noise levels are common. Existing systems have, in general, extracted a great quantity of data from speech for recognition by computer; that is to say, the data have been excessively redundant.

The present invention permits use to be made of speech suffering various distortions; and permits acceptable results to be obtained when the speech is accompanied by high levels of noise. By reducing the quantity of redundant speech data transmitted to a computer it permits speech to be recognized and recorded in printed form, in real time, with compact apparatus and a modest amount of computer capacity.

Accordingly to the invention a speech input device in a system of computer recognition of speech comprises (i) a voiced monitor which provides to a computer a signal indicating whether the sound input to the device has a fundamental repetitive structure, and signals indicating the periodicity of any such structure (ii) an unvoiced monitor which provides to the computer a signal indicating whether the sound input to the device has no low frequency component and has at the same time high frequency components in a wide range of frequency (iii) a background monitor whih provides to the computer a signal indicating the presence of relatively stable energy in the sound input to the device, characteristic of background noise with an absence of speech, and means for tracking the level of such relatively stable energy (iv) a noise color analyzer which provides to the computer, in relation to sounds having no low frequency component, signals indicating the peak frequency of sound input to the input device, signals indicating the peak amplitude of said input, and signals indicating the bandwidth of said input (v) a resonant frequency analyzer which provides to the computer, in relation to sounds having a fundamental repetitive structure, signals indicating the frequency of the resonant content of the sound and signals indicating its level of correlation.

Preferably the resonant frequency analyzer provides signals related to low, medium and high frequency bands of speech frequency; the low frequency band may be 350 Hz to 700 Hz, the medium frequency band from 700 Hz to 1400 Hz, and the high frequency band from 1400 Hz to 2800 Hz. The resonant frequency analyzer may include a band pass filter corresponding to each of said frequency bands; corresponding to each filter a tapped delay line; and associated with each said delay line multiplexing means arranged to auto correlate the outputs from predetermined taps on said delay line with the input to the delay line. The taps on each delay line may be arranged in two groups such that auto correlation of outputs with input for a first group corresponds to a delay of the order of ¾ wave length for that filter band, and the second group corresponds to a delay of the order of ½ wave length for the same filter band.

The noise color analyzer preferably has a plurality of band pass filters covering the frequency range from about 1 KHz to about 5 KHz, a clocked multiplexer which scans the outputs from said filters in a period of the order of 1 millisecond to provide a frequency spectrum, and peak follower means which follows said spectrum and stores the peak value until the next subsequent scan of the spectrum.

The background monitor preferably has an energy envelope follower producing a voltage proportional to a sound energy input to the said device; stable energy detector means which detects, for successive periods of the order of 40 milliseconds, whether the said voltage has remained inside given upper and lower treshold values; background level tracking means which compares an accumulated output from the stable energy detector means with the output of the energy envelope follower; so that when speech is present in the sound energy input, zero signal is provided by the background monitor to the computer.

The unvoiced monitor preferably includes a filter which removes frequencies lower than about 100 Hz; an infinite clipper which clips the filter output; a pulse width filter the output of which is arranged to be high at frequencies above about 2 KHz; logic and integrating means which integrates the output of the pulse width filter over periods of the order of 20 milliseconds; whereby a signal is provided to the computer indicating whether the sound energy input has unvoiced characteristics.

The voiced monitor preferably includes a band pass filter passing frequencies in the range from about 40 Hz to about 2.5 KHz; a tapped delay line fed from said filter, said delay line providing a maximum delay of the order of 15 milliseconds; differential amplifier means for comparing the outputs from taps on the delay line with the input to the delay line, whereby all correspondences between the tap outputs and the input at any given time are matched to a resolution of the order of 156 microsecond; circuit means to select continually the minimum and maximum values of said correspondences, and to compare the differences between said minimum and maximum values with two predetermined threshold values and hence provide to the computer a signal when the input sound has a fundamental repetitive structure; and frequency measuring means which provides to the computer a measure of the periodicity of any said repetitive structure.

Also according to the invention, a method of supplying input information in a system of computer recognition of speech comprises extracting information from an analogue signal which may contain speech and feeding in parallel to a computer, arranged for speech recognition, information derived from said analogue signal.

(i) indicating whether the signal has a fundamental repetitive structure and the periodicity of such structure
(ii) indicating whether the signal has no low frequency component and at the same time has high frequency components in a wide range of frequency.
(iii) indicating the presence and level of relatively stable energy in the signal, characteristic of background noise with an absence of speech
(iv) indicating, in relation to a signal having no low frequency component the peak frequency of the signal, the peak amplitude of the signal and the bandwidth
(v) indicating, in relation to a signal having a fundamental repetitive structure, the frequency of resonant content and the level of autocorrelation thereof.

The invention will be further described, by way of example, with reference to the accompanying drawings in which.

Figure 1:
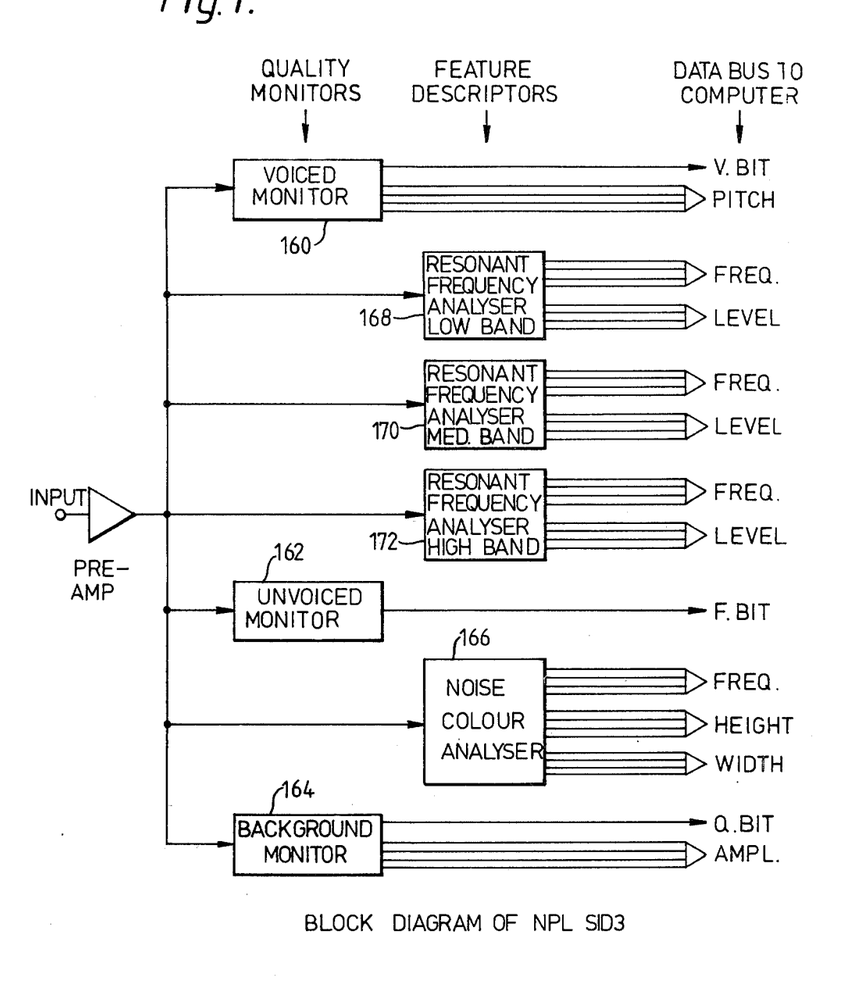
FIG. 1 is a general diagrammatic circuit diagram.

In the following some abbreviations have been adopted
AGC=Automatic Gain Control
IC=Integrated circuit FIG. 1 illustrates diagrammatically, in simple form, the various functional areas of the circuitry of the speech input device. The voiced monitor is indicated generally by 160, the unvoiced monitor by 162, the background monitor by 164, and the noise color analyzer by 166. The resonant frequency analyzer is represented by three blocks 168, 170 & 172 relating respectively to low, medium and high frequency bands. The functions of the various areas of circuity are described in detail below.

The purpose of developing Automatic Speech Recognition devices is to give to a computer system the capability of interacting intelligently with a human, by responding directly to his or her spoken comments.

At the front end of any automatic speech recognition system therefore there has to be a transducing device that converts the pressure signal emitted from the speaker's mouth into a form that may be accepted by the computer containing the recognition logic.

If the recognition logic resides in a digital computer, then the transducing hardware must produce a digital code that contains the information that conveys the meaning of the speech.

In its simplest form the transducing hardware need only be a microphone connected to an analogue to digital converter. As long as the converting rate is well above the highest frequency signal in the speech waveform and there are sufficient levels to accurately reproduce the relative amplitudes of the signals, no data will be lost. However this is a very inefficient technique as it requires extensive, high speed, computer memory, to deal in real time, with the vast amount of data produced. Most of this is redundant to the meaning of the speech.

A more efficient system will reduce the amount of data sent to the computer by extracting from the speech signal the information that conveys the meaning of the speech, all other data being discarded.

Earlier work assumed that the task of discovering the parameters in speech that conveyed its meaning would be made easier if the speech were utterred under "ideal contions." The term "ideal" in this context meant the use of a wide bandwidth, high quality microphone in a relatively quiet environment, connected to the analyzing system by a high fidelity channel.

It has been found by experience that this is not the best platform from which to start as the analyzing techniques developed for the ideal situation can not always be transferred to more natural conditions. To overcome this problem we now specify that any speech processing procedure to be adopted, must be capable of working properly under the followng "less than ideal" conditions:

1. NOISY ENVIRONMENTS

The apparatus must function consistently in normal room ambient noise and also when other sounds such as aircraft noise or equipment hum are present. It should be tolerant to signal to noise ratios typically as low as 10 dB.

2. USE OF LOW QUALITY CHANNELS AND MICROPHONES

Restrictions on the bandwidth of the microphone, or the channel connecting the microphone to the speech analyzing hardware, must not affect the response of the hardware anymore than it would a human listening to the same speech. For instance, the public telephone frequency bandwidth of 300 HZ to 3 KHz should be tolerated.

3. UNCONSTRAINED SPEECH

The system must consistently analyze speech whether the words are spoken in isolation or strung together as is more natural. Variations in accent between speakers should not cause any major differences in speech data produced for similar words, although variations may occur when linguistic features are pronounced in different orders for similar words.

This "worst case" approach has resulted in the present invention in speech analyzing hardware that extracts from a speech signal information relating to the meaning of the speech. The amount of data produced represents a considerable reduction compared to direct AtoD conversion and is also far more consistent throughout all of the above less than ideal conditions.

The apparatus according to the invention contains a range of modules, each designed to analyze a particular aspect of speech. There are two kinds of modules. Firstly those that detect a specified quality and secondly those that describe various features of that quality.

FIG. 1 of the drawings provides an overall view, in flow diagram form, of the speech input device, and allows the modules described individually in detail in the specification, and illustrated in the drawings, to be seen in relation to one another.

The quality monitor modules are designed to function independantly. Each makes an assessment of a particular quality of speech based on a characteristic that is unique to that quality. In no way does it refer to any information derived by another monitor. This mode of operation was adopted for three reasons:
1. So that the design of each quality detector could be specific for that quality;
2. To give the greatest possible tolerance to enviroment, as an error by one monitor will not affect the ability of another to continue working; and
3. To enable parallel decisions to be made. These are often of importance (e.g. in relation to voiced-fricatives)

Our apparatus contains three quality monitors that classify and thereby segment the speech signal into groups of sounds that have been generated by similar vocal tract configurations. The qualities detected are those of Voiced speech, Unvoiced speech and No speech.

When humans speak the source of energy for the sound is air from the lungs. This drives the various cavities of the vocal tract. Contained in the throat are the vocal chords or larynx. The larynx may be controlled in two ways while speaking, and each imparts a distinctive quality to the pressure waveform emitted from the mouth.

If the larynx is tensed and shut, a back pressure, caused by air from the lungs, builds up against the larynx until it is strong enough to force it open. This releases the pressure so that the larynx closes again and the cycle repeats itself. The larynx therefore vibrates and the air stream is gated into the vocal cavities as a succession of regularly spaced pressure maxima. These "pulses" of air stimulate the cavities to resonate so that the pressure waveform leaving the mouth consists of a mixture of resonant frequencies carried on the fundamental frequency of oscillation of the larynx. The waveform is repetitive or "Coherent." Sounds of this quality are Voiced, examples being the vowels and nasals.

When the larynx is relaxed and open, unvoiced speech is produced. The air stream from the lungs is not interrupted before it enters the vocal tract. Constrictions within the vocal tract impede the air stream causing turbulence. This turbulence imparts a random character to the air movement which is reflected in the pressure waveform leaving the mouth by the wide range of values of both the frequency and amplitude components of oscillation. There is also no fundamental frequency present.

The sounds emitted are Unvoiced, examples being the fricatives "s", "f", and "sh".

When the air from the lungs is moving slowly, as in normal breathing, or is completely stopped at some closure, then the vocal tract is not being driven, so the vocal cavities neither resonate nor cause turbulence. No speech or sound is therefore produced from the mouth. Although this may appear trivial it is not so, because when this Quiet characteristic occurs, it is one of the important qualities that separate linguistic features at the phoneme level.

To monitor the quality that a speaker is imparting to a sound the characteristics of the qualities must first be compared.

The following differences exist:
1. The pressure waveform produced at the mouth by a voiced sound is repetitive at the frequency of vibration of the larynx and contains a structured pattern of resonant signals. Voiced sounds therefore may be said to be coherent. Unvoiced sounds are incoherent as their pressure waveform is unrepetitive and random.
2. Voiced sounds contain frequencies that are related to the size and shape of the vocal cavities and are therefore restricted to a definable frequency band. Unvoiced sounds are not confined to such a limited bandwidth due to their random nature.
3. As voiced sounds are resonant they will generally be greater in energy than the non-resonant unvoiced sounds.

What we term the voiced monitor will now be described. Most of our previous work on the segmentation of speech into areas of similar quality relied on characteristics 2 and 3 last above. This lead to difficulties when the bandwidth of the channel was limited or the background noisy.

To overcome these problems our present apparatus employs a technique that monitors characteristic 1 last above, so that detection of a voiced sound is achieved by measuring the coherence of the pressure waveform emitted from the mouth.

Basically the principle is to overlay a section of the signal, containing the speech, with succeeding similar length sections and to monitor any correspondence that occurs. As long as these sections are longer than the period of the larynx oscillation, then a good match, with high correspondence will be achieved if the waveform is repetitive. If the signal is random and therefore unrepetitive a poor match with low correspondence will result, irrespective of length of section.

Figure 2:
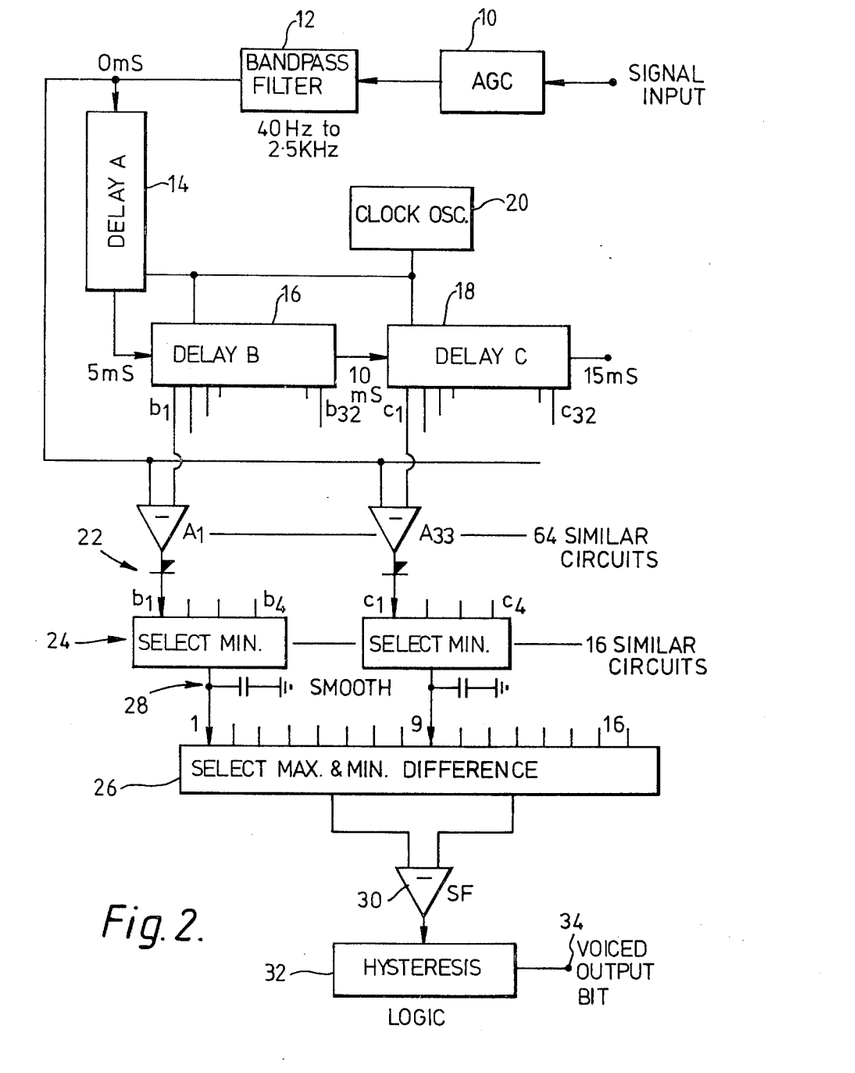
FIG. 2 is a block circuit diagram of a voiced monitor.

A logical diagram of the circuit that carries out this process is shown in FIG. 2. The signal containing the speech is fed, via an AGC 10 and bandpass filter 12, to the analogue delay line consisting of IC.A 14, IC.B 16 and IC.C 18. Each of these integrated circuits is a 32 stage, charge transfer, analogue shift register. As all three are connected to a common clock 20 that is oscillating at 6.4 kHz, then each shift register delays its input by 5 mS producing a total possible delay of 15 mS.

However all thirty two stages of each shift register 14, 16, 18 are tapped so that each tap output reproduces the input signal delayed by 156 uS with respect to it's predecessor. The normal range of larynx (pitch) periods for adults is between 5 mS (200 Hz) and 12.5 mS (80 Hz), so if the input signal to the delay line is voiced speech and therefore coherent, one of the tap outputs from 16 or 18 will be in phase with the input to 14. At the same time most of the other tap outputs will be out of phase with the input signal to some degree.

The differential amplifiers, A1 to A64, continually compare all sixty-four tap outputs from 16 and 18 with the input signal to 14; so that, all correspondences between the current input signal and the preceeding 15 mS of signal are matched to a resolution of 156 uS. This resolution is required to prevent the high frequency components in voiced speech from reducing the correspondence between successive larynx periods when the pitch changes slightly. Having provided the correspondence circuits with this resolution, the actual pitch of the voice does not need to be tracked so accurately. A reduction in resolution is achieved by rectifying the sixty-four correspondence values as indicated at 22 and then selecting the smallest output from each group of four adjacent taps as indicated at 24. This provides sixteen outputs each monitoring the best correspondence achieved for successive delays of 625 uS from a delay of 5 mS to one of 15 mS.

The best and worst correspondence within this 10 mS range, relating to delay line tap outputs that are in phase and out of phase at any instant, are found by selecting continuously at 26 the minimum and maximum values of the sixteen outputs. This is achieved using two diode arrays to effect linear logic circuits that accomplish these functions. The logic contains smoothing circuits indicated generally by 28 to prop up the correspondence values at the end of each larynx period when the resonating signals from the cavities in the vocal tract are dying away.

The coherent quality of the signal is determined by IC.SF indicated at 30 as the difference between the best (min.) and worst (max.) correspondence values. This is called the Structure Factor. It is compared at 32 with two predetermined thresholds to decide whether or not it is high enough to be due to voiced speech being present in the input signal. A high Structure Factor asserts the Voiced output at 34 while a low Structure Factor inhibits this output. The logic 32 carrying out this comparison contains hysteresis so that "spikes" due to impulsive noise and "drop outs" due to short term pitch or resonant frequency transitions are removed from the output.

Figure 3:
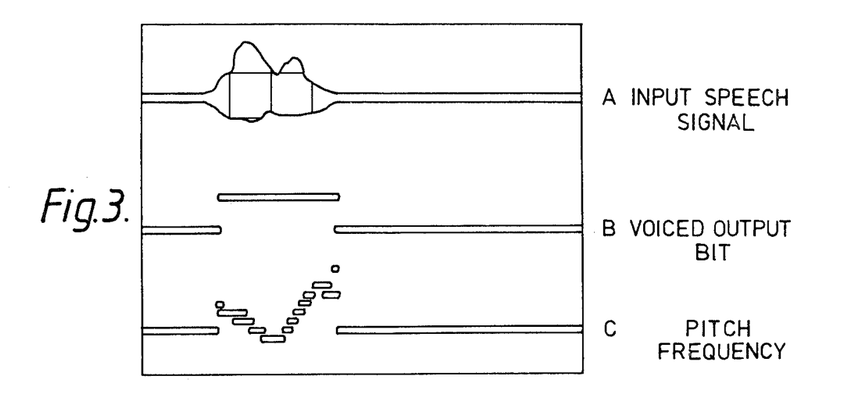
FIGS. 3, 4a and 4b illustrate the response of the voiced monitor to speech inputs of different quality.
Figure 4A:
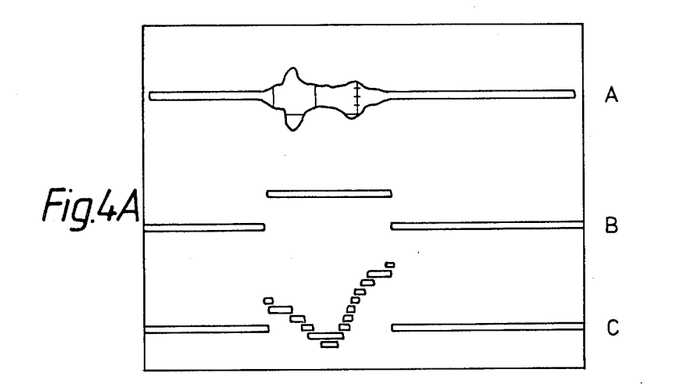
Figure 4B:
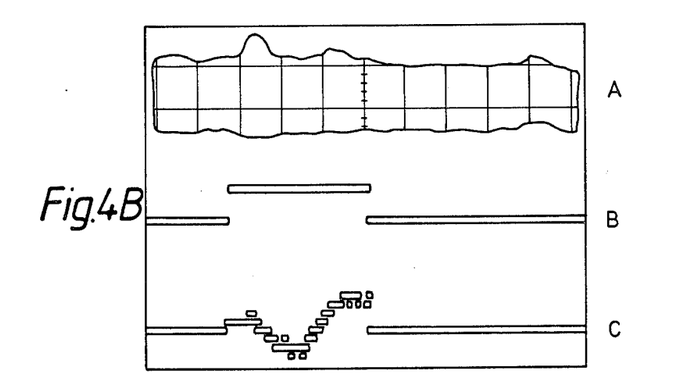

The output from the Voiced Monitor will label all voiced speech sounds as coherent. As the technique relies on the pressure waveshape of the sound rather than its frequency components it is tolerant to restrictions in the bandwidth of the channel. It also copes with high levels of random background noise as the coherent quality of voiced sounds is still apparent even when noise is mixed with the speech. By way of an example, the photographs reproduced as FIGS. 3 and 4a, show how the voiced monitor performs on speech that was uttered both in ideal conditions and also through a local Switched Telephone Network. In FIG. 4b the effect of adding white noise to within 5 dB of the maximum speech level is shown. In all cases the voiced output faithfully monitored the voiced areas and successfully segmented the speech on this basis.

In each of FIGS. 3, 4A and 4B trace A is the speech input signal; trace B is the output bit from the voiced monitor; and trace C the pitch frequency of the voiced speech.

As well as monitoring the coherent quality of voiced speech this module also tracks the actual pitch of the voice. This is accomplished by comparing the best correspondence value (i.e. the min.) with all sixteen correspondence values in sixteen voltage comparators incorporated in 26. Only the output from that group of delay line taps that produced the best correspondence value will assert its comparator, all others being inhibited. As the resolution at this level is reduced to 625 uS, the pitch is tracked to this accuracy within the range from 200 Hz to 80 Hz. The single comparator that is asserted at any instant produces a 4 bit binary word representing its position within the sixteen. The variations in this code dynamically reflect the pitch changes.

The output from the Voiced Monitor therefore comprises, in all, five bits. One bit labelling the coherent areas in the signal and four bits representing the frequency of the coherence. This data is continually available to the recognition logic at the parallel output of the speech input device where it may be sampled at a rate specified by this logic.

The next part of the apparatus of the speech input device to be described is termed the unvoiced monitor.

Speech sounds that are generated when the larynx is relaxed have two main characteristics.

(a) There is no fundamental low frequency signal
(b) There are present, signals covering a wide range of both frequency and amplitude with no apparent structure These characteristics are fundamental to the random nature of unvoiced sounds. They are produced by the turbulence at points of constriction in the vocal tract.

Figure 5:
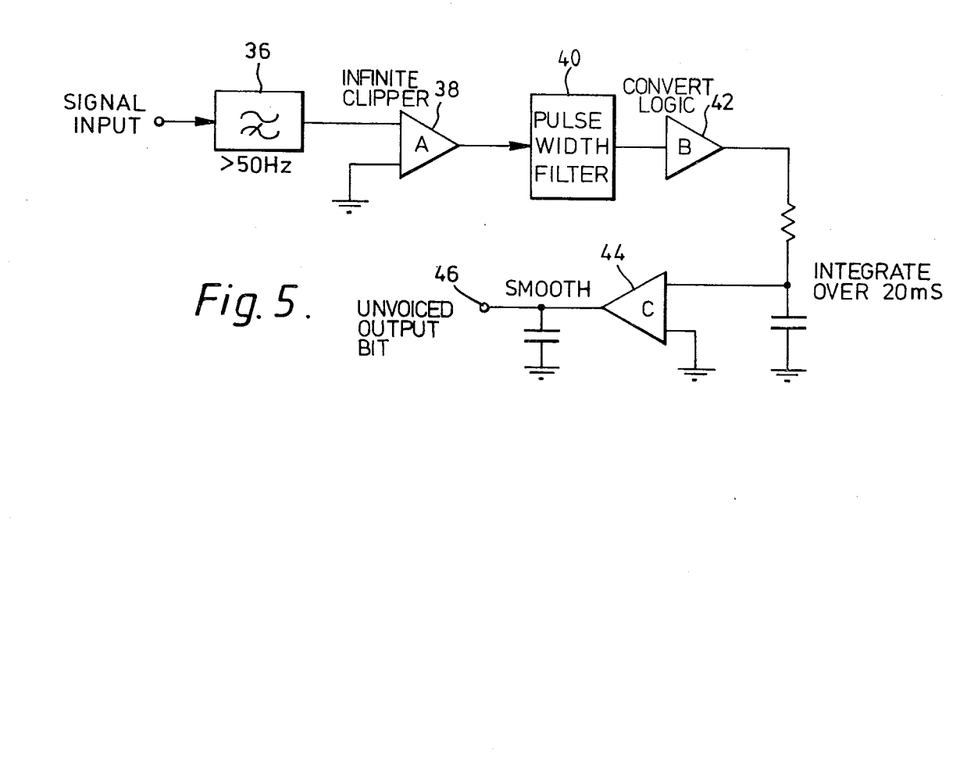
FIG. 5 is a block circuit diagram of an unvoiced monitor.
Figure 6A:
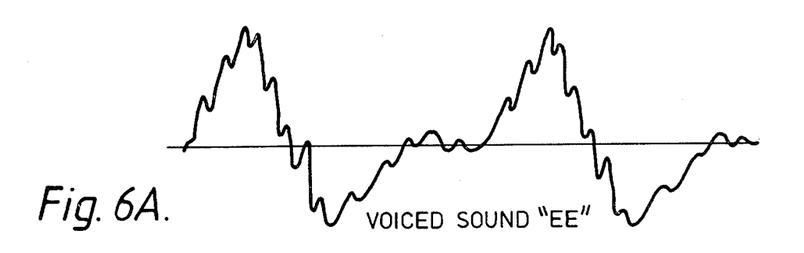
FIGS. 6a to d illustrates difference in response of the unvoiced monitor between voiced and unvoiced speech sounds.
Figure 6B:
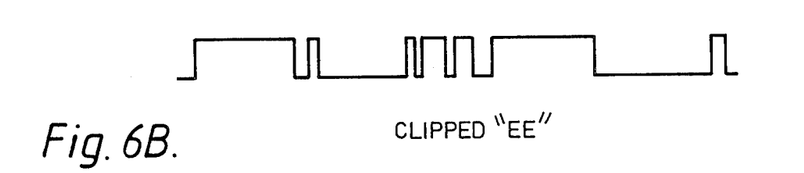
Figure 6C:
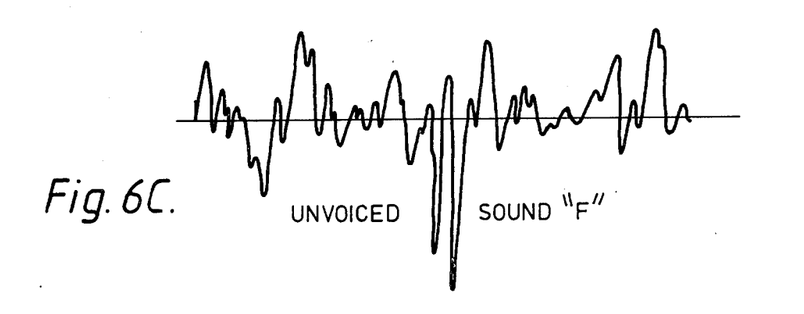
Figure 6D:
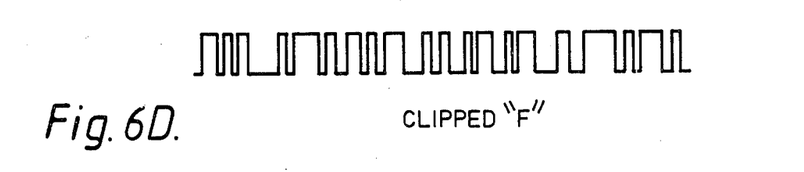

The unvoiced monitor uses digital techniques and a block schematic diagram of the logic is shown in FIG. 5. The input signal containing the speech is infinitely clipped by voltage comparator 38 after being fed through a high pass filter 36 to remove low frequency room noise below 100 Hz. If the input signal is voiced speech and therefore contains a dominant low frequency component, the output from the clipper only contains small periods of any high frequency signals present at times when the lower dominant frequency is changing phase. If on the other hand the input signal is unvoiced speech, it does not possess the low frequency dominant component so the clipper output continually reproduces the frequency of the higher components. The difference is illustrated in FIGS. 6a to 6d. FIG. 6a shows the waveform of voiced sound "ee" and FIG. 6b the clipped equivalent. FIG. 6c shows the waveform of the unvoiced sound "f," and FIG. 6d the clipped equivalent. The unvoiced monitor logic measures the amount of high frequency signal at the output of comparator 38 to determine the presence of an unvoiced sound.

This measurement is achieved by using a retriggerable monostable as a pulse width filter 40 that holds its output high when its input signal is above 2 KHz. When the input signal is unvoiced speech the output of this monostable is predominantly high, while if the signal contains voiced speech the output is predominantly low. This predominance is detected after converting the signal to be symmetrical about ground by passing the signal through an interface logic device 42. This integrates the output of 40 over a 20 mS period to remove any short term transitional effects before being compared with a ground reference in a comparator 44. If the signal is positive the output from 42 was predominantly high and the unvoiced output bit is asserted at 46. This signifies the absence of any low frequency dominant component in the input signal to 36. If the signal from 44 is negative the output from 42 was predominantly low and the unvoiced output bit is inhibited.

The unvoiced monitor does not explore the random nature of unvoiced speech, it simply monitors the absenece of a low frequency fundamental component in the signal. For example, a signal containing only a high frequency continuous sine wave causes the "unvoiced bit" to be asserted just as does white noise.

As the Voiced Monitor, already described, will also assert its output when a high frequency sine wave is fed to the system, some other method of detecting this type of signal is required. A further module is therefore included in the apparatus that monitors the background level and also detects steady state continuous, and so non-speech like sounds. This module we refer to as the Background Monitor.

The function of the Background Monitor is to track the amplitude of the background noise when no speech is present, so that, a discrimination can be made between this level and the level when speech is present to determine areas of "quietness", as related solely to speech.

Figure 7:
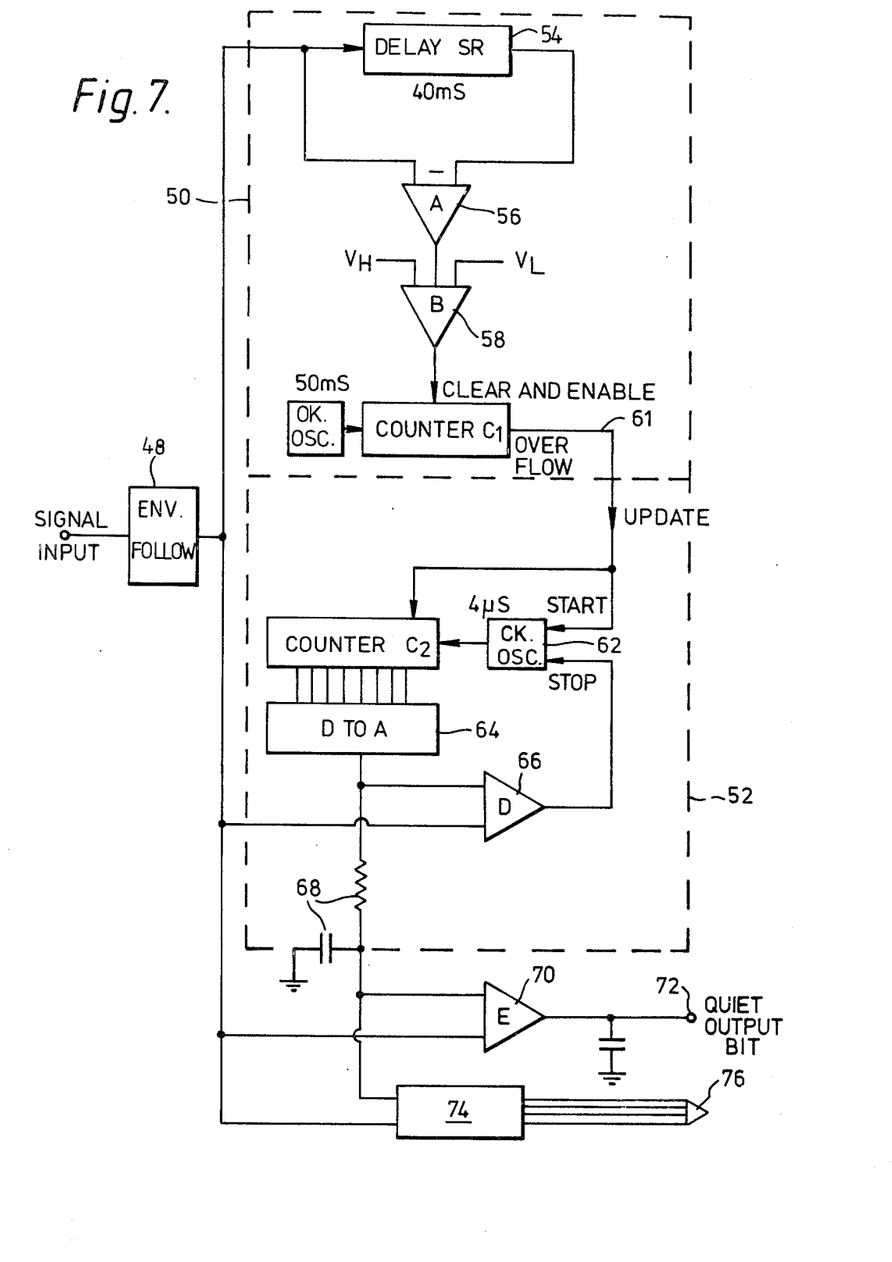
FIG. 7 is a block circuit diagram of a background monitor.

This enables "quieteness" to be detected without any reference to either of the other quality monitors. The logic required to continuously track the ambient level is shown in FIG. 7 together with the comparator that accomplishes the discrimination.

The input signal containing the speech, is fed to an energy envelope follower 48 which produces, by peak rectification, a positive voltage of amplitude proportional to the signal energy. This voltage follows the combined energy of the background and the speech. It is therefore necessary to identify times when speech is probably not present so that the background level will only be measured at these times.

A characteristic of most background noise that is not usual during speech is the relatively stable state of the energy envelope. The energy envelope of speech is rapidly changing compared to this condition. The difference is exploited by the logic shown in FIG. 7 to (a) detect the periods during which this condition is valid, and (b) to update a threshold to the prevailing background level.

The background monitor may be regarded as being in two principal sections.

(a) Logic to detect areas of Stable Energy, indicated generally by reference 50 in FIG. 7 and (b) Logic to Track the Background level, indicated generally by reference 52 in FIG. 7

The signal from the envelope follower 48 is delayed in the analogue shift register 54, for 40 mS. The delayed output is compared with the input signal by subtraction in the differential amplifier 56.

If the signal level has remained stable for the past 40 mS, the output of 56 stays within window voltage thresholds, Vh and Vl, applied to comparator 58. A decade counter C1 is allowed to count up as the output of 58 asserts its enable line.

If the signal level significantly changes during the 40 mS period then the output of 56 goes outside the window set by Vh and Vl and counter C1 is cleared by the output of 58 removing the enable signal.

The clock 60 to counter C1 oscillates with a period of 50 mS so if this counter ever reaches its maximum, then 500 mS (i.e. 10×50 mS) of relatively stable energy has been detected. The overflow 61 from this counter indicates that speech is probably not present and that it is therefore valid to measure the ambient level at this time.

The background threshold level is stored in digital form in an eight bit binary counter, C2. The clock 62 driving this counter is normally inhibited but when an overflow occurs from C1, C2 is cleared and then made to count as it's clock oscillator 62 is started. This clock 62 oscillates with a period of 4 uS so counter C2 counts up at this rate. The eight stages of C2 are connected to the eight inputs of a digital to analogue converter 64 thereby generating a linear ramp at the output of 64. This ramp would normally take 1 mS to reach its maximum value, but it is held at the prevailing background level by the comparator 66 which compares the output from the envelope follower 48 with the linear ramp and stops the clock to C2 when the inputs to 66 are the same.

As long as no speech is present in the input signal to the Background Monitor, the background level is updated every 500 mS. When speech is present, the background level is prevented from updating and thus maintains the value of the last level prior to the speech commencing.

The actual task of the Background Monitor is to label areas in the signal where no speech is present. This is achieved by continually comparing the background level derived from the D to A converter 64 with the current output of the envelope follower 48. An integrator 68 is placed between 64 and the comparator 70 accomplishing this task, to remove the 1 mS update ramp from the decision. As long as the background level and the output from the envelope follower remain similar the "quiet" bit is asserted at the output 72 of comparator 70. When speech is present in the signal fed to the silence monitor the output from the energy envelope follower goes above the background level and inhibits comparator 70 from asserting the "quiet bit" in the output.

This technique copes well with noisy environments as the background level derived in the monitor is continually updated and therefore follows changes in the ambient noise level that are generally slow compared to changes in speech. The background monitor also copes with "structured" noise such as steady sinusoidal signals produced by rotating machinery, as the detected background level depends only on the relative stability of the signal energy and not on its constituent parts.

An extra facility added to the background monitor enables the amplitude of the speech above the background noise platform to be measured. This is achieved by comparing the output from the signal envelope follower with a predetermined set of sixteen thresholds indicated at box 74. These thresholds are set on a logarithmic scale anchored to the background level detected by the monitor, so that, as the background level moves up and down so too do the sixteen thresholds. The highest threshold crossed at any instant by the speech envelope is binary coded into four bits and made available at the output of the module at 76. This enables not only silence to be monitored but also the relative energy of the speech to the background. This information can be important, particularly as both the other quality modules in the speech input device mask this, giving equal weighting to any quality that is detected.

Next to be described are what we term the feature describers of the speech input device.

Both the voiced and unvoiced qualities detected in the speech input device encompass large groups of speech sounds. The voiced sounds include all the vowels and the nasals as well as some other consonants, while the unvoiced sounds include the fricatives and many other consonants.

To segregate the individual members of a quality type, it is necessary to describe, in detail, particular characteristics of the group.

During both voiced and unvoiced speech the size and shape of the vocal tract cavities are varied by movements of components within the tract, such as the tongue and the lips. This produces different resonant frequency components for the various voiced sounds and changes the spectral shape of the unvoiced sounds.

The speech input device possesses four modules that analyze these parameters and so provide the information to the recognition logic that enables it to monitor individual phonetic elements.

We deal first with the describer termed the noise color analyzer.

Unvoiced sounds are produced by the speaker causing turbulence within a stream of air flowing from the lungs.

The wide frequency range of signals present in the speech, due to this turbulence, gives rise to the characteristic random noise sound. However, by varying the shape of the vocal tract and the point of constriction, generating the turbulence, each unvoiced sound can be made to possess a distinctive sound and hence spectral shape.

Figure 8A:
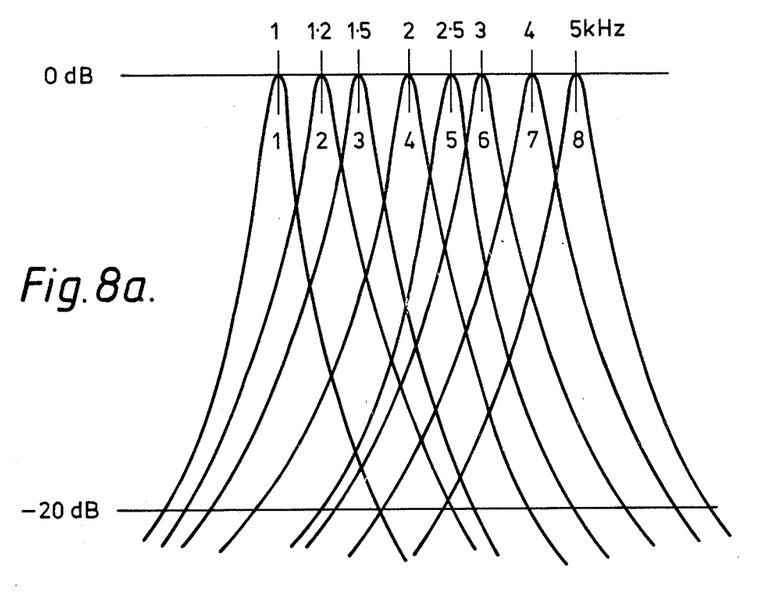
FIG. 8(a) illustrates filter characteristics for the noise color analyzer.
Figure 8B:
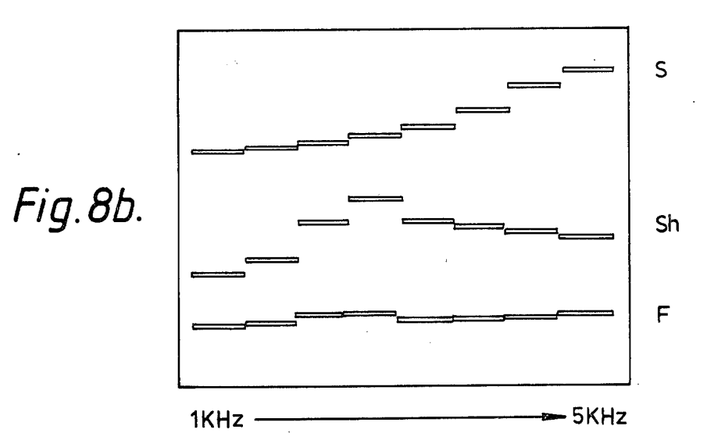
FIG. 8(b) illustrates band widths of some different speech sounds.

Examples of the differences in the spectral shapes of three typical unvoiced sounds, caused by variations in the vocal tract, are shown in FIG. 8b. It can be seen that when different unvoiced sounds, as indicated at the right of the figure, are uttered, both the peak frequency and the amplitude of the signal spectrum change, as well as the bandwidth of the sound. As we have shown, by experiment, that these characteristics are important to the correct perception of an unvoiced sound by humans, the function of the Noise Color Analyzer in the speech input device is to measure these parameters. This information is then relayed to the output of the device where it is available for sampling by recognition logic. The analysis is continuous so that variations in the spectral shape or "noise color" may be monitored to help determine the particular phonetic feature sequence being uttered. This spectral analysis also provides a description of the background noise, which can assist the discrimination of unvoiced sounds in noisy environments.

Figure 9:
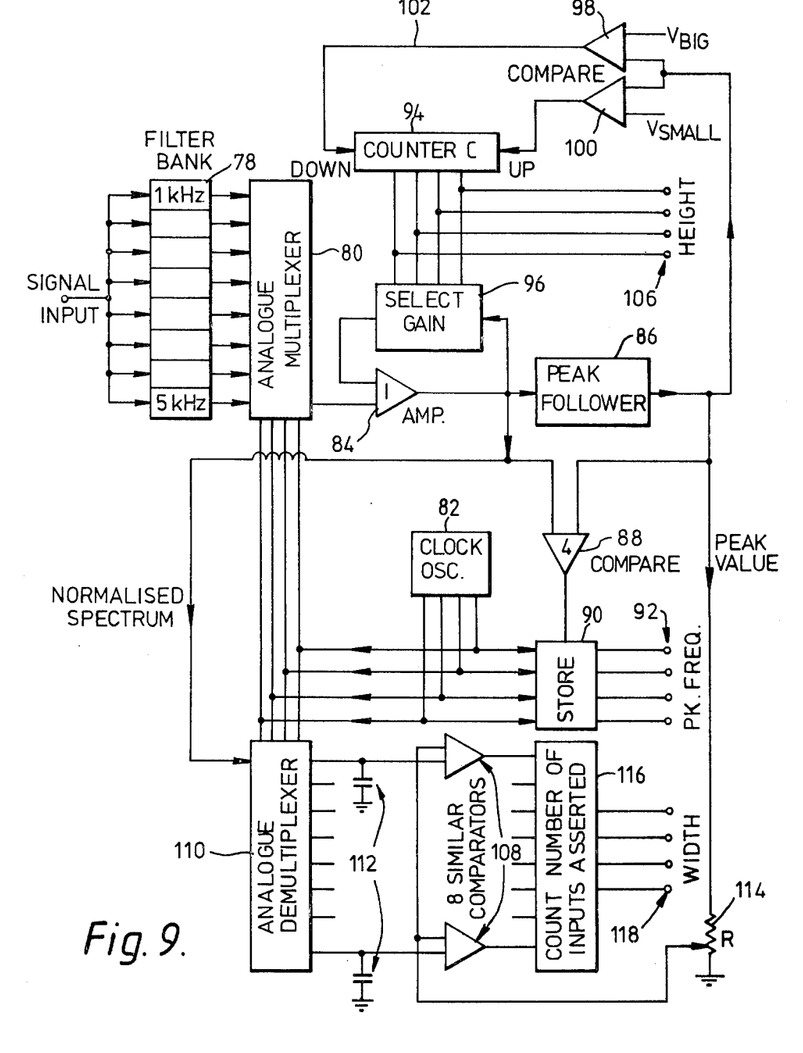
FIG. 9 is a block circuit diagram of a noise colour analyzer.

The circuits of the noise color analyzer are shown diagrammatically in FIG. 9.

The signal containing the speech is fed to a filter bank 78 consisting of eight constant "Q" bandpass filters in the range 1 KHz to 5 KHz. The frequency response curves of these eight filters are shown in FIG. 8a. It was decided to analyze the unvoiced sounds in this band for two reasons:

1. As previous work had shown that the unvoiced sounds predominantly occupy this region of the spectrum.
2. To keep the analysis within the usual telephone bandwidth.

The outputs from the filter bank are connected to eight of the inputs of a sixteen channel analogue multiplexer 80, that is clocked by an oscillator and counter 82 so that it scans the eight filter outputs in 1 mS. As the other eight inputs to the multiplexer are grounded, a further 1 mS elapses before the filter outputs are rescanned.

A spectrum of the energy in the eight filters is therefore produced at the multiplexer 80 output once every 2 mS, with a 1 mS gap between successive spectra. During these gaps the preceeding spectrum is analyzed and the following measures taken.

(a) DETERMINATION OF THE FREQUENCY OF THE PEAK (F) OF THE NOISE SPECTRUM

The spectrum output from the analogue multiplexer 80 is fed to the linear amplifier 84, and then to a circuit 86 that follows the peak of this spectrum. As this peak follower 86 tracks the amplitude of the spectrum up to the peak and then holds this value until the next multiplexer scan, the position where the peak output deviates from the spectrum input is the position of the peak. The comparator 88 makes this comparison and asserts it's output at the instant of deviation of the two signals. The change in the level of the output of 88 is used to clock the current value of the multiplexer clock 82 into a four bit store 90. The output of this store therefore provides, at the output 92 of the Noise Color Analyzer, a binary number between one and eight which represents the position of the filter in the filter bank producing the peak value. The peak value is updated every scan of the multiplexer so that the peak frequency output monitors changes in the spectrum shape at 2 mS intervals.

Due to variations in the amplitude of the unvoiced sounds the height of the spectrum peak can vary. To overcome these changes so that comparator 88 is always comparing signals above its minimum sensitivity, the spectrum height is normalized to a predetermined value. The normalization procedure provides a means of measuring the height of the spectrum peak.

(b) DETERMINATION OF THE HEIGHT (H) OF THE PEAK OF THE SPECTRUM

The linear amplifier 84, amplifying the spectrum signal from the analogue multiplexer 80, has a variable gain. The gain is set by decoding the value of the binary counter 94 and selecting an appropriate feedback resistor from an array 96. The array contains eight resistors and the selection is controlled by eight field effect transistors. The peak follower 86 stores the value of the spectrum peak during the 1 mS gap between successive spectrums, so that, during the gaps the comparators 98 and 100 can compare this peak value with two predetermined thresholds, Vbig and Vsmall.

If the peak of a spectrum is between the thresholds neither of the outputs 102, 104 from comparators 98 or 100 is asserted to the counter 94, and therefore the gain of amplifier 84 is unaltered.

If the peak of a spectrum is greater than Vbig, then the output 102 is asserted, which forces the counter 94 to count down by 1, so that the gain of 84 is reduced by one step.

If the peak of a spectrum is less than Vsmall, then the output 104 is asserted which forces the counter 94 to count up by 1, so that the gain of 84 is increased by one step.

By this process the level of the peak of the unvoiced spectrum is normalized to be between Vbig and Vsmall. As there are eight possible feedback resistors in 96 the maximum time to normalize a spectrum will be 16 mS, (each step taking 2 mS as this is the period between successive spectra). The value of the counter 94 normalizing the height of the spectrum, is a direct record of the amplitude of the unvoiced spectrum peak, so the outputs from this counter provide this information as four bits of the output of the Noise Color Analyzer output at 106.

(c) DETERMINATION OF THE BANDWIDTH OF (W) OF THE UNVOICED SPECTRUM

In unvoiced sounds a considerable variation exists in the band of frequencies containing the majority of their energy. For instance, as can be seen in FIG. 8b, "s" and "sh" exhibit a narrower bandwidth than that of of the unvoiced filter bank (from 1 KHz to 5 KHz), while the energy of "f" is uniformly spread among all eight filters. This variation in bandwidth is measured by determining the spectrum width at half the peak spectrum height.

Referring again to FIG. 9, eight similar comparators, indicated generally by 108, carry out this process. The normalized unvoiced spectrum from 84 is demultiplexed into eight channels by the analogue demultiplexer 110. This demultiplexer shares the same clock inputs from 82 as the multiplexer 80 so that its outputs relate to the filter bank 78 outputs. Also the demultiplexed values are held by capacitors 112 (one to each comparator 108) for a period longer than the 1 mS gap between the spectra. The value of half the spectrum peak is derived from the peak follower 86 output by the potential divider 114.

The comparators 108 therefore only assert their outputs when the normalized signal from a filter is above the normalized half peak height of the spectrum. The logic 116 following these comparators counts the number of comparator outputs asserted. The count takes place at a time chosen to be during the 1 mS gap between spectrums so that the comparator outputs are stable. This value representing the number of filters 78 containing more than half of the peak energy and therefore the "half bandwidth" is binary coded and fed to the output 118 of the Noise Color Analyzer as 4 bits of information.

The twelve bits of information (FHW) at the output of this module, (i.e. at 92,106 & 118) are sampled by the recognition logic following the speech input device so that a representation of the spectral shape of the unvoiced sounds can be obtained. Changes in the shape are monitored at a resolution equal to the sampling rate.

The Resonant Frequency Analyzer will now be described. Voiced sounds detected by the voiced monitor, described earlier, include vowels, dipthongs, liquids, nasals and voiced fricatives.

When a voiced sound is uttered, the cavities of the speaker's vocal tract are stimulated into resonance by discrete pulses of air gated into the vocal tract by the larynx. The vocal tract, as far as speech is concerned, consists essentially of two parts, the oral cavity and the nasal cavity. The amount each cavity is stimulated to resonate is controlled by the soft palate. When the oral cavity is the prime resonator the tongue controls the resonant frequencies and the vowel sounds are produced. However, if the nasal cavity is the prime resonator then nasal sounds are produced.

The measurement of the resonant frequencies present in voiced speech, together with the amount of resonance, therefore offers a means of describing the characteristic features of these sounds. The speech input device contrains three modules whose functions are to continually monitor these resonant signals so that during any periods of coherence, (i.e. voiced speech) useful information on the spoken sounds may be measured.

Three logically similar analyzers are provided for three adjacent frequency ranges. A block diagram of one is shown in FIG. 10.

Figure 10:
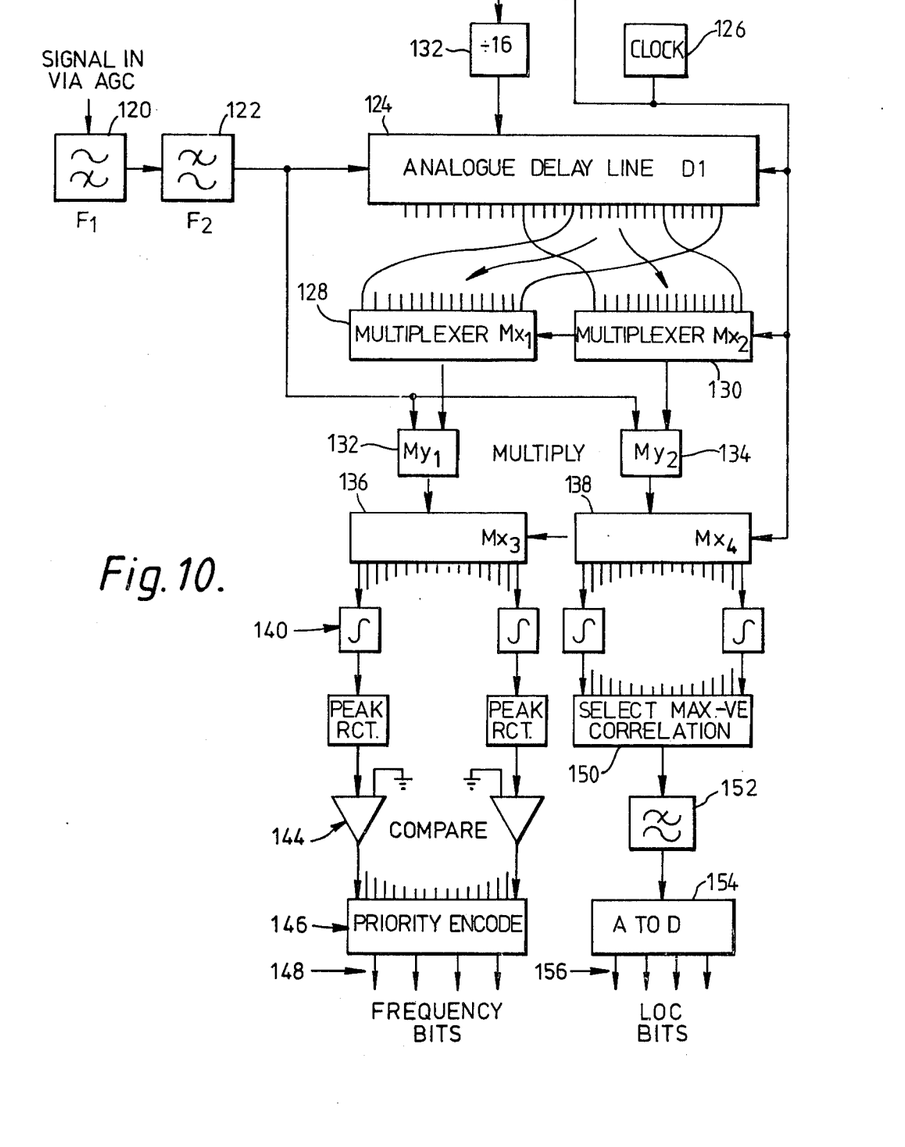
FIG. 10 is a block circuit diagram of a module of a resonant frequency analyzer.

For Initial Waveform Processing in each analyzer, the signal containing the speech is fed, via an AGC, to a bandpass filter, formed by two, eight pole, active filters, 120 and 122, in FIG. 10. These filters have cut-off slopes of 24 dB per octave and therefore segregate the signal into three components. Each component encompasses an octave as the bandwidths of the bandpass filters in the three otherwise similar analyzers are
Low band—350 HZ to 700 Hz,
Medium band—700 Hz to 1400 Hz,
High band—1400 Hz to 2800 Hz.

The three sets of in-band signals are processed, in parallel, by similar analogue autocorrelation procedures, hence the description that follows applies to each of the bands.

The output waveform from the bandpass filter is fed to an analogue delay line 124, in FIG. 10. This delay line is a thirty two stage analogue shift register so the length of the delay line depends on the frequency of the clock driving it. The clock 126 in each band is set so that the longest delay in the line is equivalent to two thirds of the wavelength of the lowest frequency signal contained in the band.

Each of the thirty two stages in the delay line may be tapped in order to pick off the signal at that delay. Therefore the autocorrelation function of the input signal at any delay, up to the above maximum, is produced by forming the product between the signal from a tap and the undelayed signal and then integrating the result.

Two sets of taps are chosen, in a range of delays along the line, that produce autocorrelation functions suitable for measuring information related to the frequency and the amount of resonance of a signal in the band. The frequency measure set, monitors autocorrelation functions at delays equal to $\frac{3}{4}$ of the signal wavelength, while the resonant measure set, employ autocorrelation functions at delays around $\frac{1}{2}$ of the signal wavelength. To reduce the complexity of the hardware necessary to carry out these processes, the two sets of tap outputs from the delay line 124 are fed to the sixteen inputs of two analogue multiplexers 128 and 130 that are driven from the same clock 126 that drives the delay line. The divider 132 between the clock 126 and the delay line 124 ensures that the delay line is clocked sixteen times slower than the multiplexers, so that every time the data in the analogue delay line shifts, the output from each multiplexer scans once around all its inputs. Only two multipliers 132 and 134 are thus required in each band to form the products, and hence the autocorrelation functions of the two sets of chosen delay periods. The demultiplexers 136 and 138 clocked in phase with the multiplexers 128 and 130 produce two sets of functions in parallel at their outputs. Each is then integrated as indicated at 140 over a period of the same order as the longest wavelength signal contained in the band to form the required autocorrelation functions.

The instantaneous frequency of a resonant signal in a band is measured by detecting which of the autocorrelation functions in a set is nearest to zero. This is achieved by peak rectifying the autocorrelation functions for both positive and negative potentials indicated at 142 and then comparing each against a zero reference indicated at 144. At any instant some of the functions will be positive while the remainder will be negative. The frequency of the resonant signal in the band is determined by the position along the delay line (i.e. the tap number) at which this transition from positive to negative takes place. This number is encoded as indicated at 146 down into four binary bits and made available at the output of the module, as indicated at 148.

The amount of resonance of a signal in a band is measured as the maximum correlation amplitude achieved by the appropriate set of outputs from the delay line 124. It is determined by continually comparing all the autocorrelation functions together and selecting, after peak rectification, the most negative of them, as indicated at 150. This signal is then smoothed by passing it through the low pass filter 152. Finally the amplitude of this maximum signal (called the Level of Correlation or LOC) is encoded into 4 binary bits using a sixteen level analogue to digital converter 154, in FIG. 10 and then made available at the output of the module, as indicated at 156.

Each of the three Resonant Frequency Analyzers produces eight bits (148,156) of binary coded information at its output. This data, when sampled by the computer containing the recognition logic, following the speech input device, continually provides a description of the resonant qualities of voiced speech. Dynamic movements of the vocal cavities that occur either when the speaker changes the voiced sound being uttered or generates a speech feature containing such transitions (e.g. stop consonants) are tracked at the sampling rate by variations in this data.

The speech input device analyzes an analogue signal that may contain speech, and produces continuously at its output sixty four bits of digital information that represent the way sixteen speech parameters vary. The results of this analysis are tolerant to changes in the acoustic environment in which the speech is uttered and also to changes of speaker.

The sixteen parameters chosen cover the following aspects:
  Speech quality in terms of voiced, unvoiced and no speech areas.
  Voiced pitch, resonant frequency and level of resonance.
  Unvoiced spectrum color.

All the parameters are produced in parallel at the output of the device where they may be sampled by a computer. To recognize any speech in the analogue signal fed to the speech input device, the computer must support software containing recognition algorithms, having knowledge of the way the chosen parameters vary when speech is present in the signal.

A description of the algorithms which may be employed for this task can be found in the following report.
  An approach to the Automatic Recognition of Speech, by B. E. Pay and C. R. Evans NPL Report DNACS 7/78, October 1978.

In the foregoing it is to be understood that individual items of hardware referred to, for example amplifiers, multiplexers, delay lines, multipliers, comparators and the like may be of a kind which would be familiar to one normally skilled in the art.

We claim:

1. A speech sound input device for providing information to a computer in a system of computer recognition of speech comprising
  (i) a voiced monitor which provides to the computer a signal indicating whether the sound input to the device has a fundamental repetitive structure, and signals indicating the periodicity of any such structure;
  (ii) an unvoiced monitor which provides to the computer a signal indicating whether the sound input to the device has no low frequency component and has at the same time high frequency components in a wide range of frequency;
  (iii) a background monitor which provides to the computer a signal indicating the presence of relatively stable energy in the sound input to the device, characteristic of background noise with an absence of speech, and means for tracking the level of such relatively stable energy;
  (iv) a noise color analyzer which provides to the computer, in relation to input sounds having no low frequency component, signals indicating the peak frequency of sound input to the input device, signals indicating the peak amplitude of said sound input, and signals indicating the bandwidth of said sound input; and
  (v) a resonant frequency analyzer which provides to the computer, in relation to input sounds having a fundamental repetitive structure, signals indicating the frequency of the resonant content of the input sound and signals indicating its level of correlation.

2. A device according to claim 1 in which the resonant frequency analyzer provides signals related to low, medium and high frequency bands of speech frequency.

3. A device according to claim 2 in which the low frequency band is from 350 Hz to 700 Hz, the medium frequency band from 700 Hz to 1400 Hz, and the high frequency band from 1400 Hz to 2800 Hz.

4. A device according to claim 2 in which the resonant frequency analyzer includes a band pass filter corresponding to each of said frequency bands; corresponding to each filter a tapped delay line; and associated with each said delay line multiplexing means arranged to autocorrelate the outputs from predetermined taps on said delay line with the input to the delay line.

5. A device according to claim 4 in which the taps on each delay line are arranged in two groups such that auto correlation of outputs to input for a first group corresponds to a delay of the order of $\frac{3}{4}$ wave length for that filter band, and the second group corresponds to a delay of the order of $\frac{1}{2}$ wave length for the same filter band.

6. A device according to claim 1 in which the noise color analyzer has a plurality of band pass filters covering the range from 1 KHz to 5 KHz, a clocked multiplexer which scans the outputs from said filters in a period of the order of 1 millisecond to provide a frequency spectrum, and peak follower means which follows said spectrum and stores the peak value until the next subsequent scan of the spectrum.

7. A device according to claim 1 in which the background monitor has an energy envelope follower producing a voltage proportional to a sound energy input to the said device; stable energy detector means which detects, for successive periods of the order of 40 milliseconds, whether the said voltage has remained inside given upper and lower threshold values; and background level tracking means which compares an accumulated output from the stable energy detector means with the output of the energy envelope follower, so that when speech is present in the sound energy input, zero signal is provided by the background monitor to the computer.

8. A device according to claim 1 in which the unvoiced monitor includes a filter which removes frequencies lower than about 100 Hz; an infinite clipper which clips the filter output; a pulse width filter the output of which is arranged to be high at frequencies above about 2 KHz; and logic and integrating means which integrates the output of the pulse width filter over periods of 20 milliseconds, whereby a signal is provided to the computer indicating whether the sound energy input has unvoiced characteristics.

9. A device according to claim 1 in which the voiced monitor includes a band pass filter passing frequencies in the range from about 40 Hz to about 2.5 KHz; a tapped delay line fed from said filter, said delay line providing a maximum delay of the order of 15 milliseconds; differential amplifier means for comparing the outputs from taps on the delay line with the input to the delay line, whereby all correspondences between the tap outputs and the input at any given time are matched to a resolution of the order of 156 microsecond; circuit means to select continually the minimum and maximum values of said correspondences, and to compare the differences between said minimum and maximum values with two predetermined threshold values and hence provide to the computer a signal when the input sound has a fundamental repetitive structure; and frequency measuring means which provides to the computer a measure of the periodicity of any said repetitive structure.

10. A method of supplying input information in a system of computer recognition of speech which comprises extracting information from an analogue signal which may contain speech and feeding in parallel to a computer, arranged for speech recognition, information derived from said analogue signal (i) indicating whether the signal has a fundamental repetitive structure and the periodicity of such structure, (ii) indicating whether the signal has no low frequency component and at the same time has high frequency components in a wide range of frequency, (iii) indicating the presence and level of relatively stable energy in the signal, characteristic of background noise with an absence of speech, (iv) indicating, in relation to a signal having no low frequency component, the peak frequency of the signal, the peak amplitude of the signal and the bandwidth, and (v) indicating, in relation to a signal having a fundamental repetitive structure, the frequency of resonant content and the level of auto correlation thereof.

* * * * *